J. RAU.
GLASS BLOWING MACHINE.
APPLICATION FILED JUNE 15, 1911.
1,061,404.
Patented May 13, 1913.
3 SHEETS—SHEET 1.
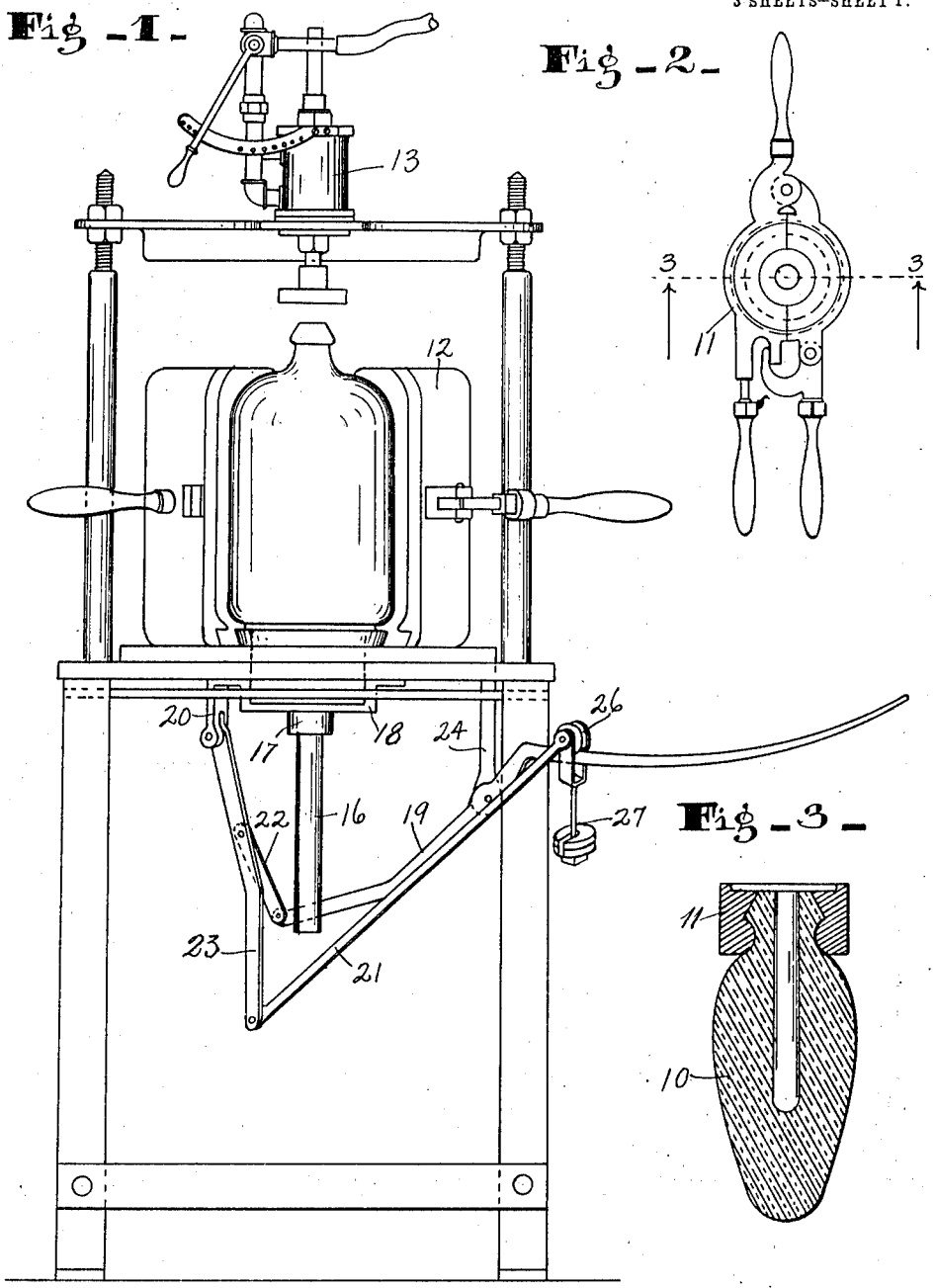
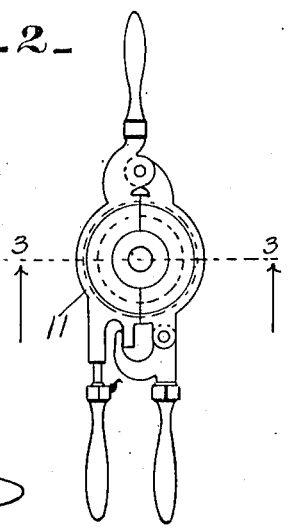
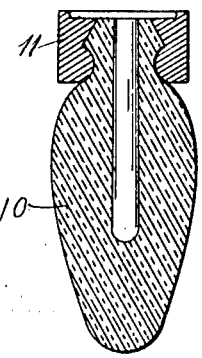
WITNESSES:
W. M. Gentle
O. M. McLaughlin
INVENTOR.
John Rau.
BY
V. H. Lockwood
ATTORNEY.

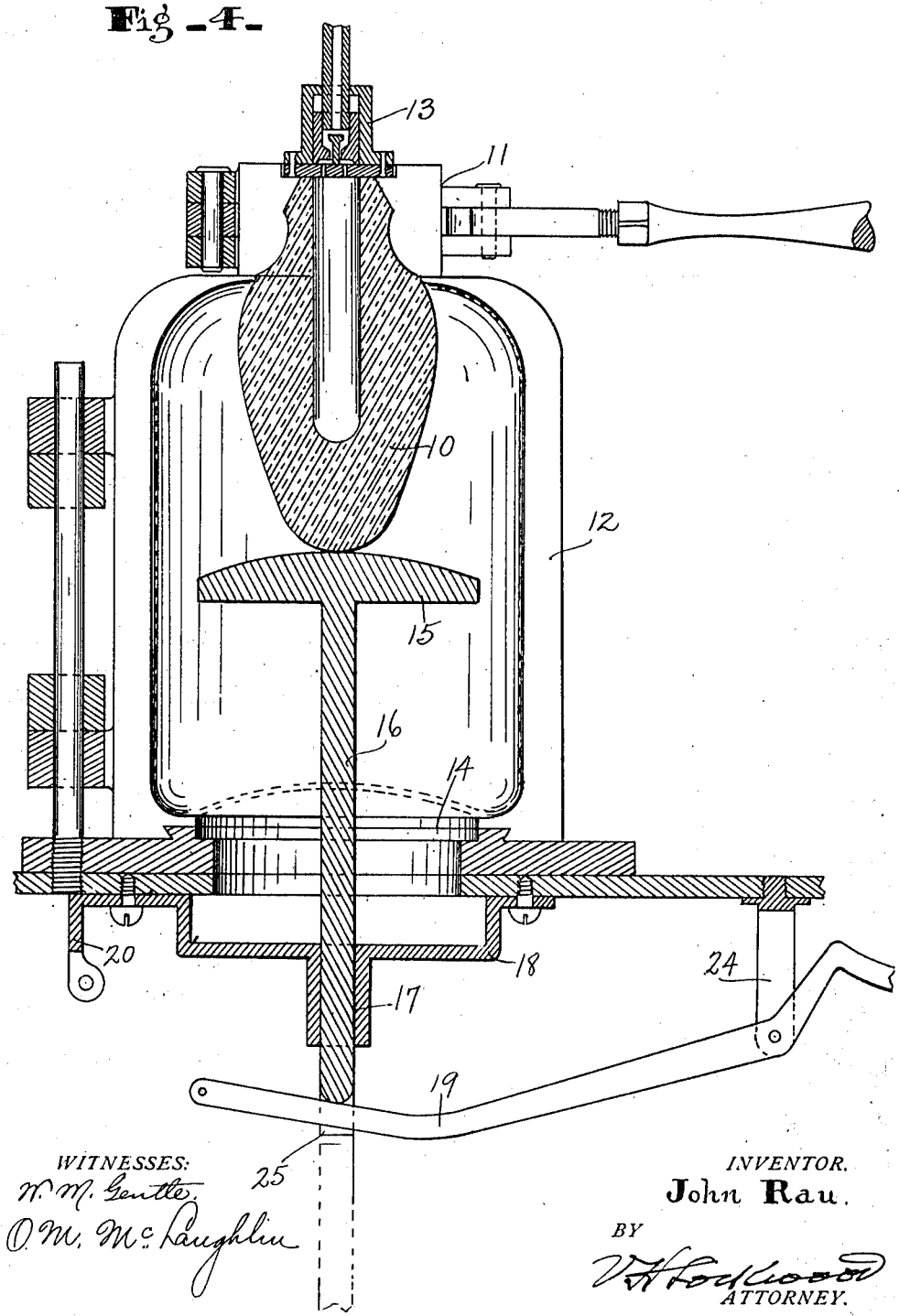

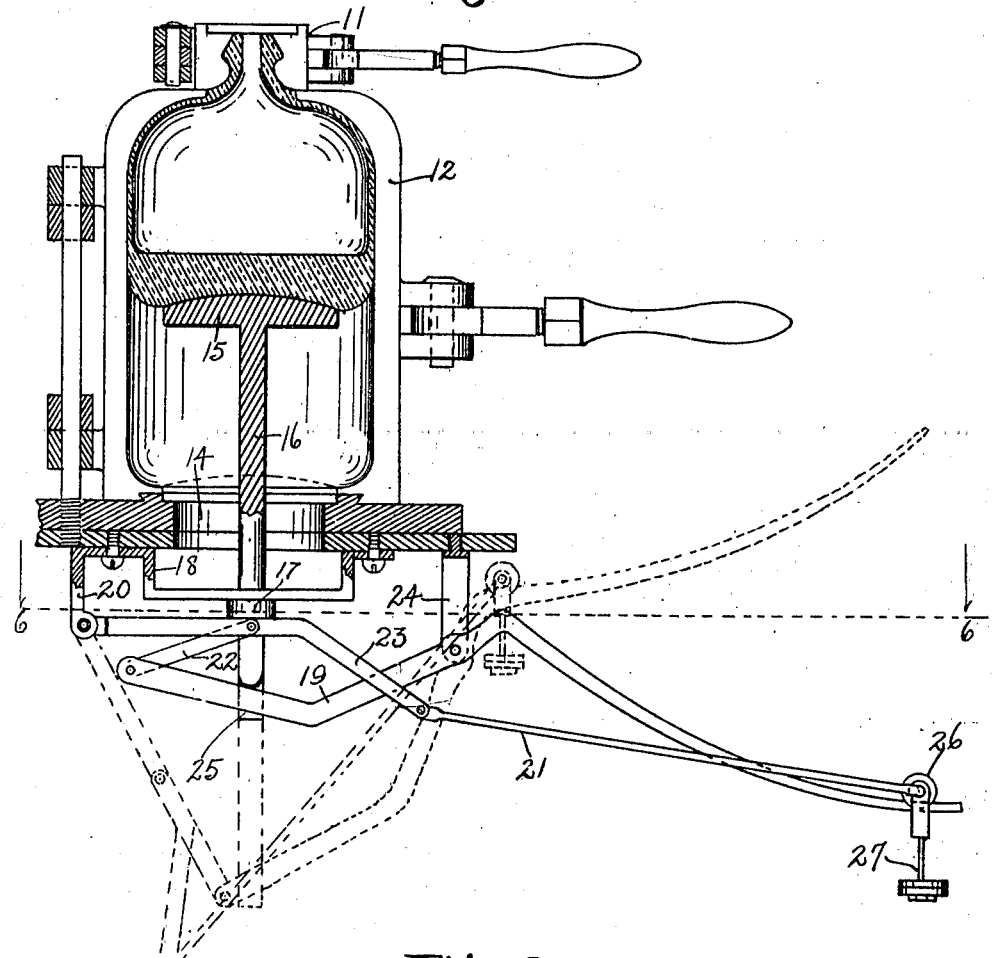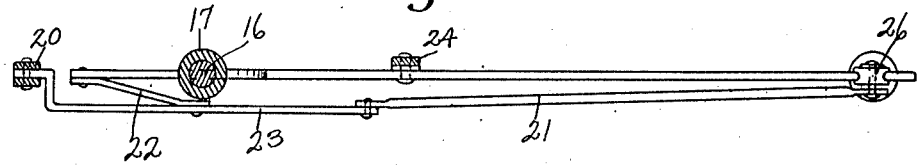

UNITED STATES PATENT OFFICE.

JOHN RAU, OF INDIANAPOLIS, INDIANA.

GLASS-BLOWING MACHINE.

1,061,404.

Specification of Letters Patent.

Patented May 13, 1913.

Application filed June 15, 1911. Serial No. 633,227.

*To all whom it may concern:*

Be it known that I, JOHN RAU, a citizen of the United States, residing at Indianapolis, county of Marion, and State of Indiana, have invented a certain useful Glass-Blowing Machine; and I do hereby declare that the following is a full, clear, and exact description thereof, reference being had to the accompanying drawings.

The object of this invention is to provide an improved glass blowing machine capable particularly of blowing very large hollow glassware.

The chief feature of the invention consists in providing the blow-mold with a vertically movable bottom and yielding means for holding it normally elevated in said mold and arranged so that the air pressure in blowing the glass blank in the mold will gradually force said bottom down to the lower end of the mold.

In blow-molds with fixed bottoms, the glass blank must extend to the bottom of the mold, which is impractical if the mold be very deep, for the lower end of such blank would chill before it would be blown. But with the movable bottom as herein provided, the blank need not be long and it will not chill and the bottom will recede as the article is blown.

The full nature of the invention will be understood from the following description and claims and the accompanying drawings.

In the drawings, Figure 1 is a front elevation of the machine with the blow-mold open and lift-over removed. Fig. 2 is a plan view of the lift-over and blank held therein. Fig. 3 is a section on the line 3—3 of Fig. 2. Fig. 4 is a vertical transverse section through the machine with portions omitted and portions broken away, showing the machine at the beginning of the blowing operation. Fig. 5 is a similar view showing a second stage of the blowing operation. Fig. 6 is a horizontal transverse section on the line 6—6 of Fig. 5.

In the process of mechanically blowing hollow glassware, it is to be understood that the "gather" of glass is first pressed into a blank 10, in which a plunger has produced a cavity. This blank is then introduced into a blow-mold, wherein it is blown or expanded by the introduction of air under pressure until the article is completed. Herein the blank 10 is supported by the lift-over 11, whereby the blank has been transferred from the press-mold. Said lift-over is placed upon the mouth of the blow-mold 12 and air introduced into the glass blank through the blow-head 13 from a source of air under pressure.

The blow-mold 12 may be of the usual two part hinged type of mold, except that it is open at the lower end where a seat 14 is provided for the movable mold bottom 15. The movable bottom 15 is rigidly secured to a rod 16, which has vertical movement through a bearing 17 in a projection 18 from the base of the machine. A bent lever 19 fulcrumed at one end to a projection 20 from the base of the machine has secured to its free end a guiding lever 21, and midway between its ends there is pivotally secured a link 22, which is also pivotally secured to a second bent lever 23 fulcrumed in a projection 24 from the base of the machine. Said lever 23 projects through and operates in a vertical slot 25 in the rod 16 from the mold bottom; and the free end of this lever acts in the nature of a balance beam, whereby the mold bottom may be held in any desired position. A sheave wheel 26 is adapted to roll on the free end of the lever 23 and has secured to it a weight holding member 27. The guiding lever 23 is pivotally secured to the wheel 26 and as the mold bottom is moved down, the weight member is moved inward from the full-line position to the dotted line position shown in Fig. 5. Thus, as the mold bottom descends toward its seat, the lever arm decreases and the force tending to hold the mold bottom in its elevated position decreases.

In the operation of the invention, the glass blank 10, in which a cavity has been pressed as heretofore described, is transferred to the blow-mold 12 and the mold closed. The movable bottom of the blow mold is then raised until it touches the lower end of the blank, and this movement will, through the guiding levers 19, 21 and 22, cause the weight member 27 to take a position on the outer end of the lever arm 23. The blow-head 13 is then brought into communication with the upper end of the lift-over and air introduced under pressure into the blank and the blank blown to conform to the outlines of the upper end of the blow-mold and the movable bottom, as shown in Fig. 5. The weights on the weight carrying arm 27 are so adjusted that the movable bottom 15 will have no descending movement until this first blowing operation has been completed, but after the blank has been blown to conform to the outlines of the blow-mold, the pressure of the air therein will cause the downward movement of said movable bottom, which will allow further blowing of the blank until the bottom 15 has reached its seat 14, when the entire operation will be completed and the bottle will be formed as shown in Fig. 1. It may be said in further explanation of the process that the neck and ring are formed at the same time that the cavity is made in the blank, and after the blank is introduced into the blow-mold no change is made in said upper portion, the blowing being confined to the sides and bottom of the bottle.

The lever connections to the lever arm 23, as shown in Fig. 5, are kinematically arranged, so that the travel of the weight carrying member 27 is slow at the outer extremity of the travel and increases in speed as it nears the fulcrum of the lever 23. The speed of the descent of the mold bottom may be adjusted by increasing or decreasing the weight on the weight carrying member, and by this adjustment the thickness of the glass at the various stages of the blowing may be accurately governed. The lever 19 is so arranged and moved downward by the link 22 connected with the lever 23, that it, through the link 21 draws the weight 27 inward with increasing rapidity after the downward movement of the bottom has begun; and when the weight 27 is in its inmost position, the parts are such as to normally hold the bottom 15 down, while, when the weight 27 is in its outer position, the parts will hold the bottom normally elevated.

In the operation of the device herein shown, it was contemplated that the glass blank inserted in the upper end of the blow mold would limit the upward movement of the movable bottom and that the latter part of the upward movement of the movable mold bottom preferably follow the insertion of the glass blank. The resistance to the upward movement of the movable mold bottom caused by the lower end of the semi-molten glass blank, would be sufficient to check such upward movement. In its operation the resistance of the lower end of the glass blank acts against the weight 27. After air enters the blank, it spreads laterally until it meets the wall of the mold and then begins to press downwardly and that overcomes the counter-weight 27 and causes the mold to move downwardly and the weight 27 to move inwardly so that the resistance of said weight to the downward movement of the bottom increases as it moves upward. The movable bottom is elevated by hand by bearing down on the outer end of the lever 23 until the movable bottom reaches the blank which has been previously inserted in the mold, and its upward movement is resisted thereby. Then the parts are in the position shown by full lines in Fig. 5. As the movable bottom descends, the weight 27 moves inward, thus reducing and varying the leverage or affecting the weight, but after the bottom has made half or more of its downward movement, the movable weight 27 reaches a point on the lever 23 where it is overbalanced and thereafter and during almost the latter half of the downward movement of the movable bottom, said bottom drops by gravity. This is due to the fact that the movable bottom 15 and rod 16 and the inner end of the lever 23 are sufficiently heavy to overbalance the outer end of the lever 23 and the weight 27 before it reaches the dotted line position in Fig. 5. Hence, the movable bottom thus moves away from the descending blank or glass article so as not to interfere with the last part of the blowing operation.

I claim as my invention:

1. A glass blowing machine including a blow mold, a movable bottom therein, a rod extending down from said bottom, a lever engaging said rod for elevating the same, and a weight adapted to travel on said lever toward the fulcrum thereof as the movable bottom moves downward.

2. A glass blowing machine including a blow mold, a movable bottom therein, a rod extending down from said bottom, a lever engaging said rod for elevating the same, a weight on said lever, and means for moving said weight along said lever toward the fulcrum thereof as the movable bottom moves downward.

3. A glass blowing machine including a blow mold, a movable bottom therein, a rod extending down from said bottom, a lever engaging said rod for elevating the same, a weight on said lever, and means actuated by said lever for moving the weight along said lever toward the fulcrum thereof as the movable bottom moves downward.

4. A glass blowing machine including a blow mold, a movable bottom therein, lever controlled means for supporting said bottom, and a weight adapted to travel on said lever toward the fulcrum thereof as the movable bottom descends, said parts being so arranged that said weight is overbalanced during the latter portion of the downward movement of the bottom.

5. A glass blowing machine including a blow mold, a movable bottom therein, a rod extending down from said bottom, a lever fulcrumed between its ends and at one end engaging said rod, and a weight adapted to travel on the other end of said lever toward the fulcrum thereof as the movable bottom descends, the parts being so arranged that the movable bottom, rod and inner end of the lever will overbalance the outer end of the lever and said weight before said weight reaches the inward limit of its travel.

In witness whereof, I have hereunto affixed my signature in the presence of the witnesses herein named.

JOHN RAU.

Witnesses:
G. H. BOINK,
O. M. McLAUGHLIN.

Copies of this patent may be obtained for five cents each, by addressing the "Commissioner of Patents, Washington, D. C."